Jan. 29, 1946.  H. W. BRUKER  2,393,586
SLITTING AND SCORING APPARATUS
Filed Nov. 7, 1944   5 Sheets-Sheet 2
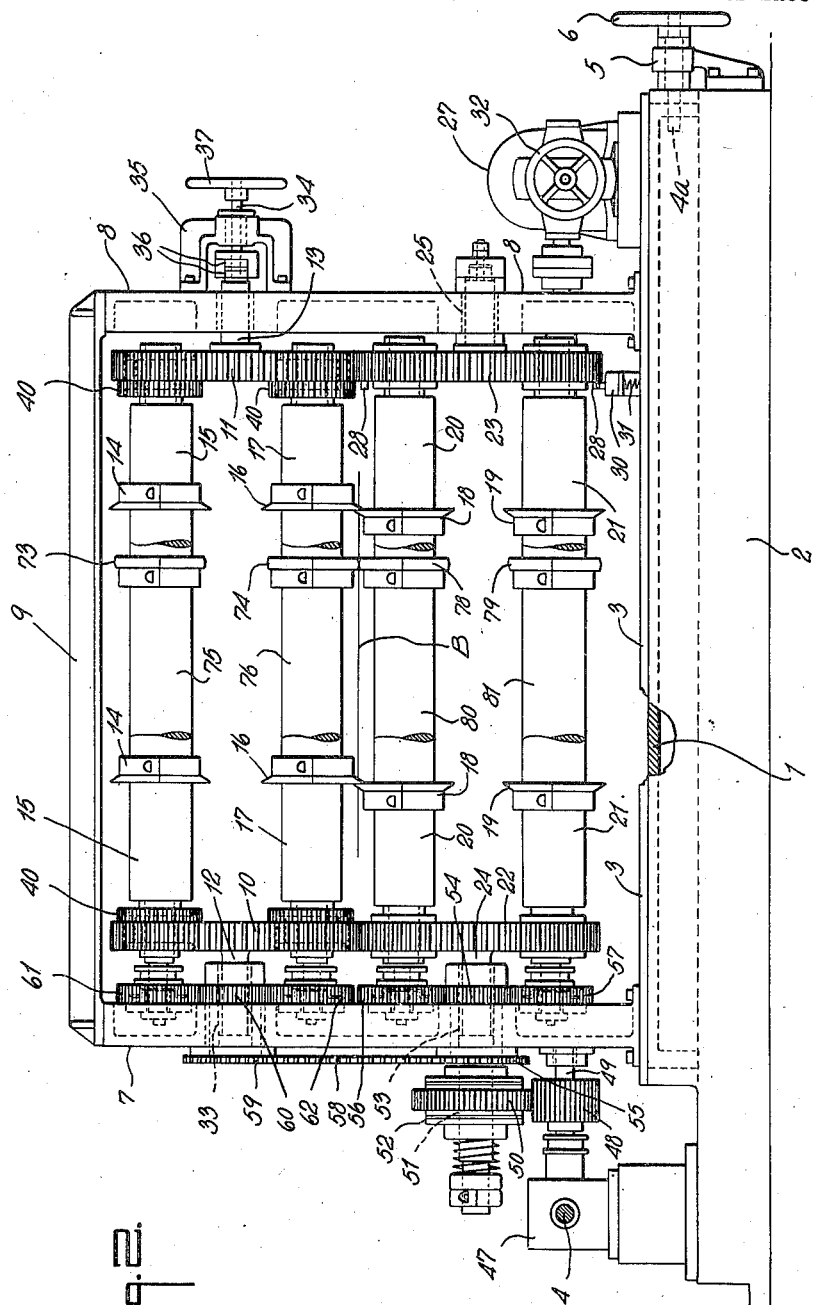
INVENTOR
Hobart W. Bruker
BY
Ward Crosby & Keel
ATTORNEYS

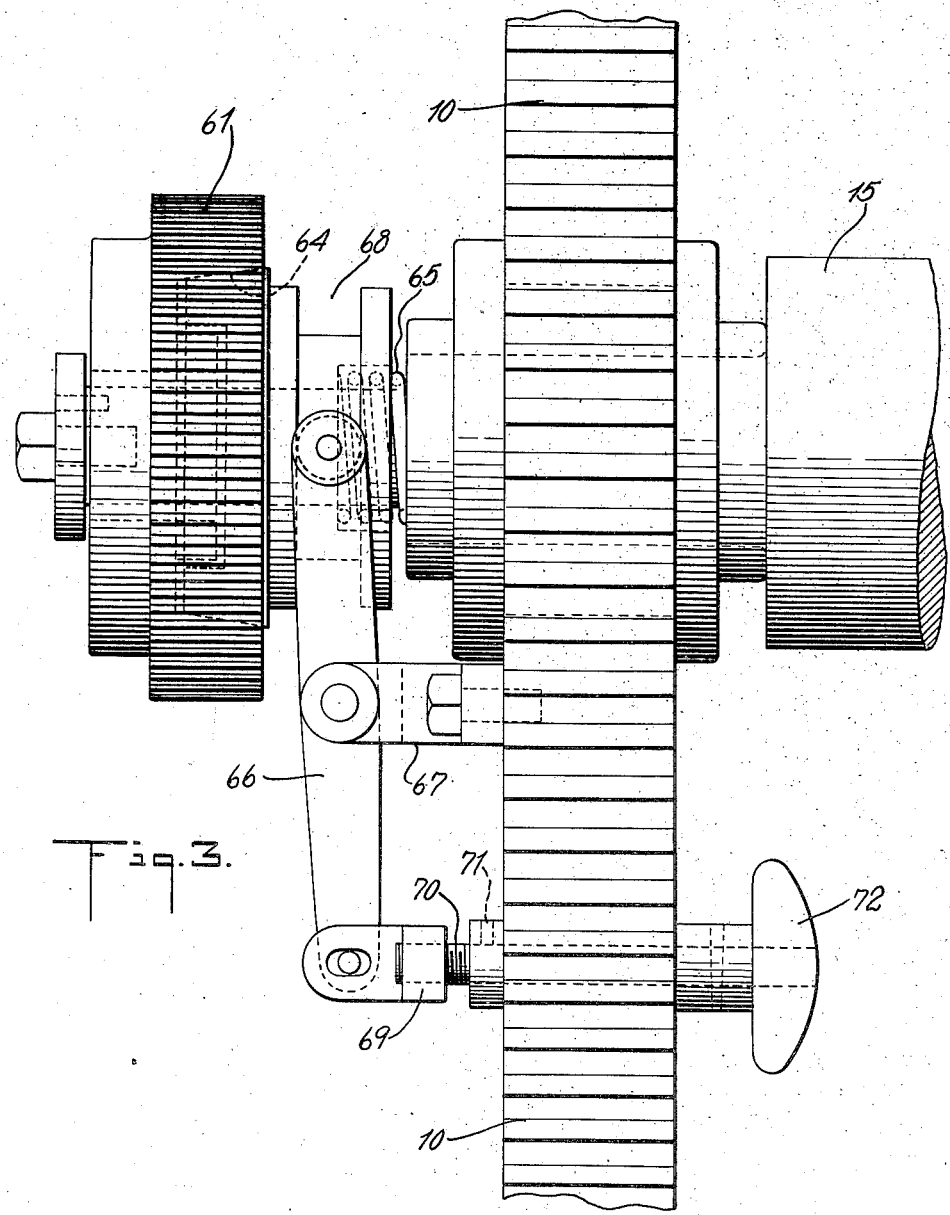

INVENTOR
Hobart W. Bruker
BY
Ward Crosby & Neal
ATTORNEYS

Jan. 29, 1946.                H. W. BRUKER                 2,393,586
                      SLITTING AND SCORING APPARATUS
                         Filed Nov. 7, 1944          5 Sheets-Sheet 5

INVENTOR
Hobart W. Bruker
BY
Ward Crosby & Neal
ATTORNEYS

Patented Jan. 29, 1946

2,393,586

UNITED STATES PATENT OFFICE 2,393,586

SLITTING AND SCORING APPARATUS

Hobart W. Bruker, Bordentown, N. J., assignor to George W. Swift, Jr. Inc., Bordentown, N. J., a corporation of New Jersey Application November 7, 1944, Serial No. 562,308

6 Claims. (Cl. 164—60)

The invention relates to slitting and scoring apparatus such as is used in the processing of paperboard, this apparatus being interposed between the so-called double facing apparatus which delivers the board in continuously traveling sheet form, and the cut-off which severs the continuously traveling board into blanks of desired length, for the purpose of slitting and scoring the continuously traveling sheet longitudinally on its way to the cut-off. The distances between the slits and scores have to be adjusted from time to time to accord with production requirements, and to shorten the time required to make adjustments of the above character it has long been customary to provide two or more slitting and scoring units which could be moved selectively between an operating position and a disk adjusting position, so that while one unit was in operation during a production run, the operator could be adjusting an idle unit to position its slitters and scorers in the locations desired for the next run. The slitting and scoring operations have been performed by sets of rotary disks adjustably mounted on transverse rotary shafts located above and below the travel of the paper web and receiving the latter between them. The above movements of the slitting and scoring units between operating and adjusting positions, in the prior apparatus, have required that one set of disks move across the path of travel of the paper web, and thus to enable one slitting and scoring unit to be substituted in operation for another, the paper web had to be severed before reaching the slitting and scoring units, and a gap created in the paper web at such units, through which gap the last mentioned disks could move in passing between operating and adjusting positions. To create this gap the feed of the paper web through the feeding and scoring apparatus was either slowed down or entirely stopped, which is undesirable from certain standpoints.

The present invention aims to provide a slitting and scoring apparatus wherein the operating parts are so constructed that the shift between operating and adjusting positions may be made without slowing down or stopping the feed of the paper web, enabling the apparatus to run continuously at any speed conformable to other production requirements, and dispensing with the need of any extra cut-off to sever the paperboard web before reaching the slitting and scoring units.

The invention is particularly advantageous in installations where there is insufficient room at the side of the apparatus to permit the slitting and scoring units to be moved to an adjusting position at one side of the apparatus, as set forth in my copending application Serial Number 549,-271, filed August 12, 1944, and entitled "Paperboard slitting and scoring mechanism."

It is also an object of the invention to reduce the waste off-dimension production incident to the operation of substituting one slitting and scoring unit for another and to reduce the time required for such operation.

Further objects and advantages of the invention will be in part obvious and in part specifically referred to in the description hereinafter contained which, taken in conjunction with the accompanying drawings, discloses a preferred form of apparatus constructed to operate in accordance with the invention. The disclosure, however, should be considered merely as illustrative of the principles of the invention in its broader aspects. In the drawings—

Fig. 3 is a fragmentary plan view showing more in detail a form of clutch appropriate for use in the apparatus of Figs. 1 and 2.

Fig. 7 is a horizontal detail section taken through a portion of the machine to show certain details associated with the bearings of certain shafts which carry web-engaging disks.

Figure 6:
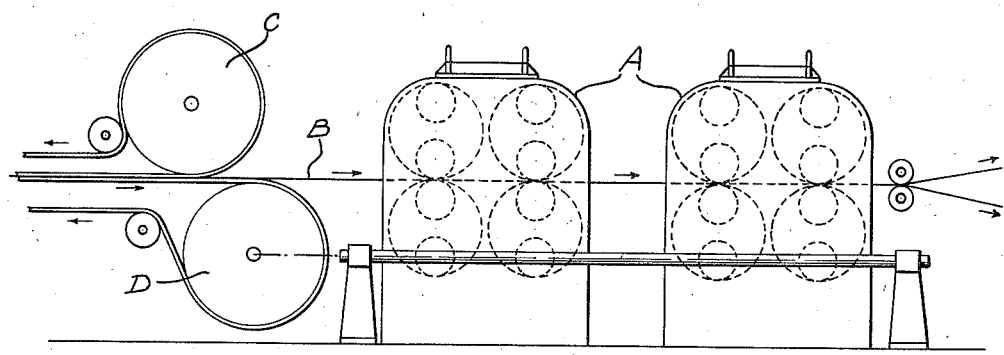
Fig. 6 is a schematic side elevation showing the apparatus in relation to the delivery end of the so-called "double-backing" machine which completes and delivers the corrugated paperboard web in a form of continuously traveling endless sheets.

Fig. 6 shows a sheet B of continuously traveling corrugated paperboard issuing from the delivery end of a double backing machine having the upper and lower drive pulleys C and D, whereupon the sheet travels without the need of any intervening cut-off to the slitting and scoring mechanism denoted generally at A, which may be driven from a side shaft 4 constituting the main drive shaft for the entire apparatus. By the slitting and scoring mechanism A, longitudinal score lines spaced the desired distances are formed in the web, and the slitting disks operate to trim the side edges of the web to the desired width and may also, if desired, slit the web into parallel strips indicated at 1a and 1b in Fig. 6.

In accordance with the present invention I provide above the path of travel of the paper web, a plurality of upper sets of operating disks which are selectively movable between an operating, web-engaging position and an adjusting or disk resetting position wherein the disks are located above and spaced from the path of travel of the web. I also provide below the path of travel of the web a plurality of similar lower sets of web-engaging disks which are so coordinated respectively with the above mentioned upper sets of disks that one set of each of the upper and lower sets are in operating, web-engaging position while another set of operating disks are in disk-adjusting position, the arrangement being such that different upper and lower sets of disks come selectively into operative web-engageable position while other upper and lower sets of disks are in disk adjusting position. Thus while certain of the sets of disks are in operation during the production run, other sets may be adjusted to the spacings needed for the next run, and at the end of the run the reset disks may be readily substituted in operation. Since none of the disks have to cross the path of travel of the paperboard web in moving between the above mentioned positions, the slitting and scoring apparatus does not require that the travel of the paper web be slowed down or stopped between runs, nor is any cut-off needed between the doutions are to be performed the slitting and scoring apparatus, since no gap in the paper web is needed in connection with the adjustment of such apparatus. The invention is operable to slitting or scoring operations performed alone or conjointly, and preferably where both operations are to be perfomed the slitting and scoring structures for each slitting and scoring unit are mounted upon separate shafts although this is not necessary to the invention in its broader aspects.

Figs. 1 to 5 illustrate one of the slitting and scoring units, of which two in series will be used as shown in Fig. 6, and since the successive units may be duplicates, a description of one will serve for both.

Figure 1:
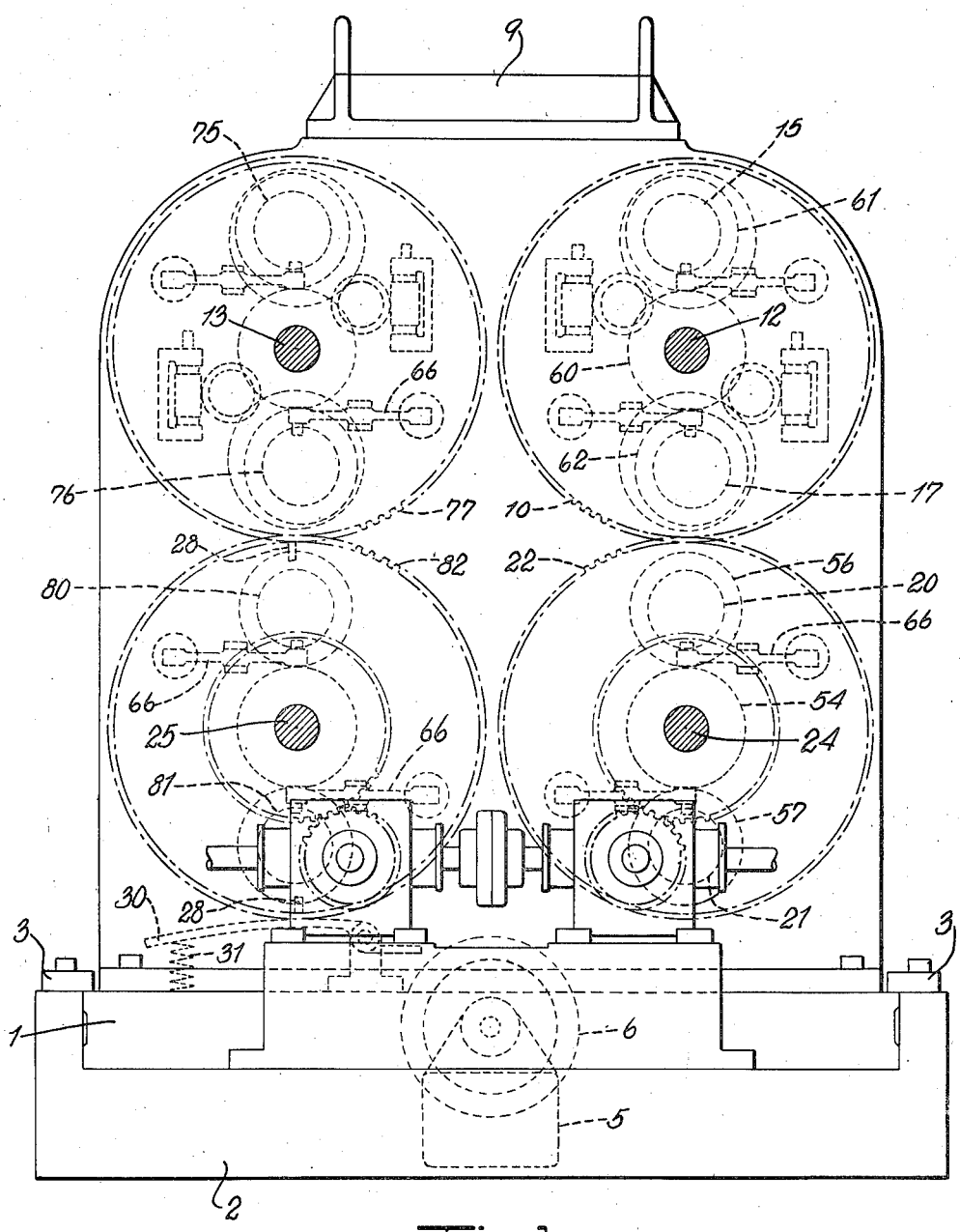
Fig. 1 is a general side elevation, with certain parts cut away, of a slitting and scoring apparatus constructed to operate in accordance with the invention.
Figure 2:
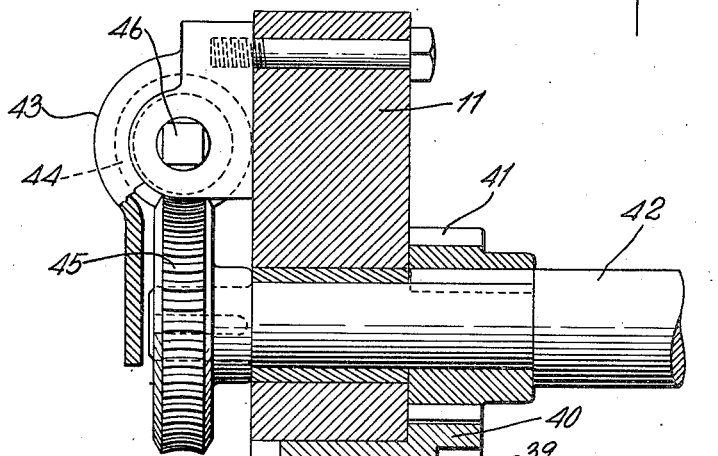
Fig. 2 is a general front elevation of the machine shown in Fig. 1.

Referring more particularly to Figs. 1 and 2, to enable the slitting and scoring structure as a whole to be alined with the path of travel of the paperboard web being operated upon, such structure as a whole may be mounted upon a carriage 1 which is mounted for transverse sliding movement upon the main bed plate 2 of the apparatus, being held in proper relation to the bed plate by transverse guide strips 3 extending across the bed plate, the position of the carriage transversely of the apparatus being adjustable by appropriate devices such as the screw 4a (lower righ hand corner of Fig. 2) which has threaded engagement with the carriage 1 and is rotatably mounted in a bracket 5 on the bed plate 2 (but held against axial movement with respect to said bed plate) the screw 4a being operated by a hand wheel 6.

In the particular form of the invention which is illustrated, the slitting and scoring structures are supported by upright side plates 7 and 8 extending upwardly from the member 1 previously described and connected at their tops by a cross brace 9.

The upper and lower web engaging disks which come into conjunction with each other in operating position, are carried by upper and lower angularly movable rotary frames, four of which are shown in Fig. 1, one pair of such upper and lower frames carrying slitting disks, and the other pair the scoring disks, and in the particular form of the invention under discussion each of such frames carries two sets of disks so arranged that one set of disks is in operating position while the other set of disks is in disk-adjusting or resetting position. Referring now more particularly to Figs. 1 and 2, the frame for the upper slitting disks is shown as consisting of gear members 10 and 11 journaled respectively on studs 12 and 13. One of the upper sets 14 of slitting disks is supported on a shaft 15, and the other upper set of slitting disks 16 is supported on a shaft 17, both of the shafts 15 and 17 extending between and being journaled in the gears 10 and 11. Likewise the lower sets of slitting disks 18 and 19 are carried respectively by shafts 20 and 21 extending between and journaled in the gears 22 and 23 which mesh respectively with the gears 10 and 11 above described and are journaled respectively on studs 24 and 25. Thus by turning the gears 10, 11, 22 and 23 angularly 180° either of the cooperating upper and lower sets of slitting disks may be brought into disk engaging position, while the other upper and lower sets thereof will be in positions spaced respectively above and below the path of travel of the web B in which positions their disks may be adjusted longitudinally of their supporting shafts to the positions needed for the next succeeding run.

Figure 4:
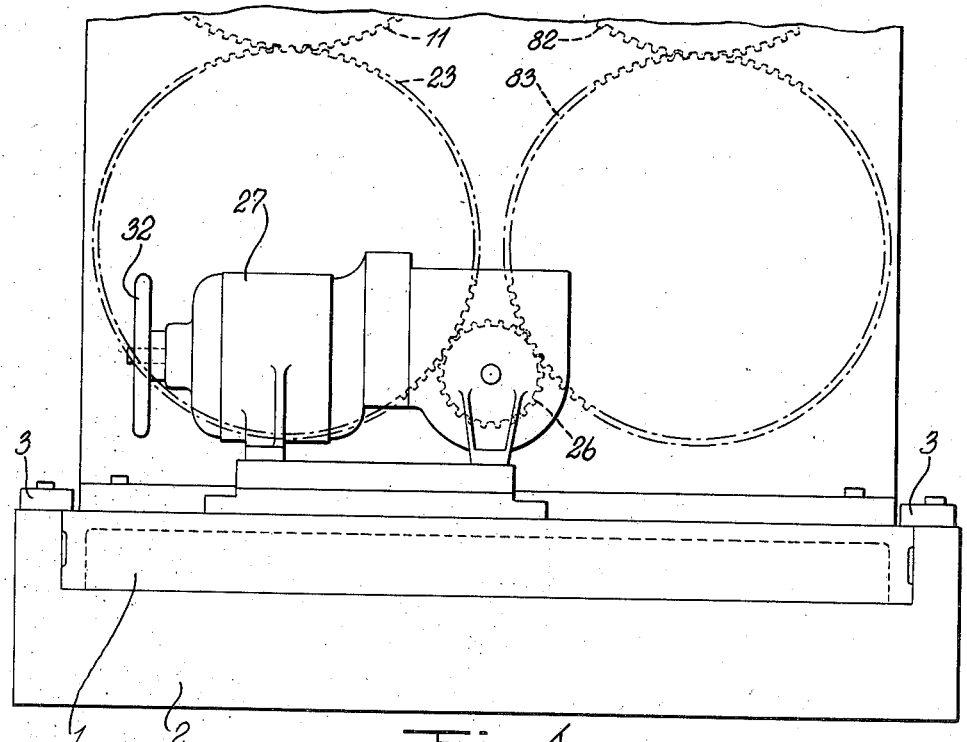
Fig. 4 is a rear elevation of the lower part of the apparatus, a substantial part of the mechanism being cut away.

Mechanism appropriate for shifting the above mentioned disk structures from one position to another will now be described. As shown in Fig. 4 a pinion 26 meshes with the gear 23 above described, and is operated (through appropriate intermediate gearing which need not be described in detail) by a servo-motor 27, thus permitting the above described upper and lower disk structures to be moved angularly under the control of the operator. Preferably a suitable stop mechanism is provided to bring the upper and lower structures to rest with their operating disks in proper angular position with respect to each other. As shown the gear 23 is provided with lugs 28 (see Figs. 1 and 2) which are spaced 180° apart, and come up against stop 29 (see Fig. 1) on a pivoted latch 30 urged toward latching position by a spring 31. Thus when the position of the above disk structures is to be shifted the operator depresses lever 30 to move the stop 29 from the path of the lug 28 which engages it, motor 27 is set in operation and latch 30 released so that stop 29 moves back into position to engage the other lug 28 when the latter comes around to it. To relieve shock, a hand wheel 32 on motor 27 may be used during a final stage of the above movement, after shutting down the motors. Preferably a supplementary transverse adjustment is provided between the upper and lower slitting disks so that they may be slightly spaced transversely from each other before being moved into web engaging, overlapping position; this adjustment being thereupon operated in the reverse direction to bring the overlapping portions of the slitting disks into contact with each other. As shown the stud 12 is slidably as well as rotatably received within a collar 33 (Fig. 2) which collar is in turn rotatably (but not slidably) mounted in the side plate 7. The stud 13 is rotatably and slidably mounted in the side plate 8, and passes through said side plate to receive the end of a screw 34 which has threaded engagement within a bracket 35 mounted on side frame 8, the inner end of screw 34 being rotatably held in stud 13 by an appropriate thrust bearing 36. Thus by operation of a hand wheel 37 the entire upper slitting disk structure may be disposed transversely a slight amount, sufficient to clear for example the slitting disks 16 and 18 from each other before they are moved into web-engaging position. Thereupon the hand wheel 37 will be operated in the reverse direction to bring the overlapping portions of such disks into contact with each other, and while the run is proceeding the slitting disks 14 and 19 will be reset to the positions along shafts 15 and 21 which are needed for the next succeeding run, usually with the aid of templates or measuring devices which need not be described since appropriate forms thereof are known in the art. After the run has been completed, hand wheel 37 will be again operated to transversely space the upper and lower slitting disks from each other, motor 27 will be operated (with the aid of stop 29) as above described to move the disks 16 and 18 from operating to disk-adjusting position, and move disks 14 and 19 into web-engaging position, whereupon hand wheel 37 will be operated in the reverse direction as above described.

Figure 5:
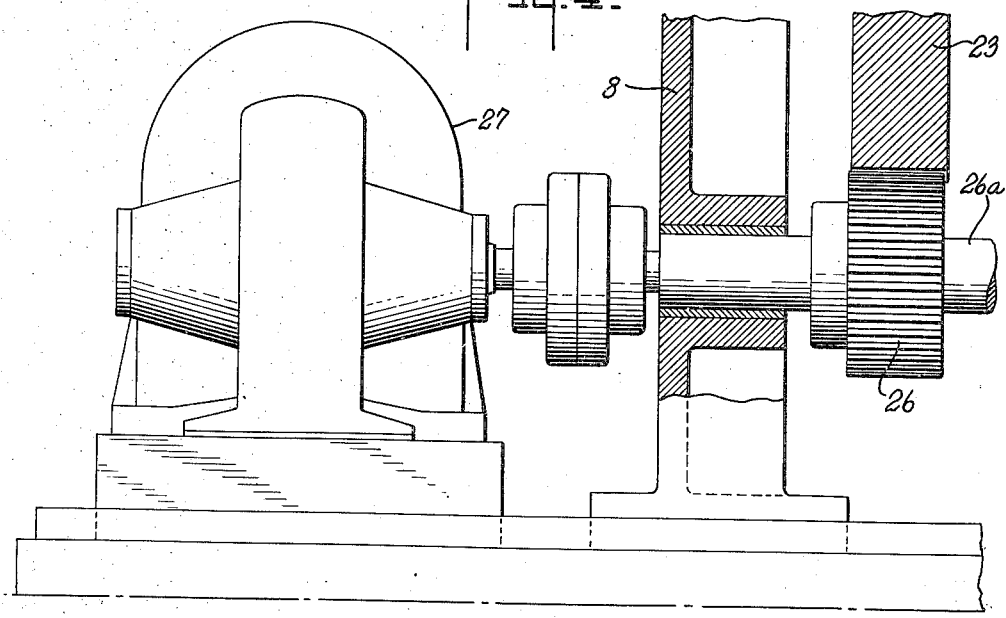
Fig. 5 is a fragmentary elevation looking from the right of Fig. 4.

As shown in Fig. 5 the pinion 26 may be mounted upon a spindle 26a, which extends across the machine and is provided at its opposite end with a pinion (not shown) similar to the pinion 26 and which engages gear 22.

The upper and lower slitting disks are preferably provided with a supplementary adjustment which will enable them to be adjusted toward and from each other while in operative position to accord with the thickness of the web being operated upon. In the illustrated embodiment of the invention such an adjustment is shown for each of the upper slitting disk supporting shafts 15 and 17. Since the two adjustments may be duplicates, description of one will serve for both.

As shown in Figs. 2 and 7, the shaft 15 at each of its ends is journaled in a sleeve 38 which is rotatably carried within an eccentric collar 39, which latter has affixed thereto a gear 40 meshing with a pinion 41 fixed to a shaft 42. A bracket 43 attached to the gear 11 has rotatably mounted in it a worm 44 meshing with a worm wheel 45 on a shaft 42 and provided with a nut 46 at one end, which the operator may turn with an appropriate wrench. The spindle 42 may run across the machine to the gear 10, and is provided with a pinion (not shown) similar to the pinion 41 meshing with the eccentric gear 40 (see Fig. 2) which is rotatably mounted in gear 10. By turning the nut 46 the eccentric sleeves may therefore be adjusted to position the upper slitting disks to adjust the overlap of the upper set of slitting disks which is in operation, with respect to the cooperating lower sets of slitting disks.

An appropriate driving mechanism for the rotary web-engaging disks will now be described. As shown in Fig. 2, power may be obtained from a drive shaft 4 at the side of the machine, a suitable gear box 47 being provided in which the power is transmitted to a driven pinion 48 (Fig. 2) on a shaft 49 journaled in a side plate 7. A gear 50 rotatably carried by a shaft 51, meshes with pinion 48 and transmits the power to shaft 51 through an appropriate friction coupling 52 which need not be described in detail. A collar 53 which is fixed to shaft 51, rotatably and slidably receives the stud 24, and is provided with a gear wheel 54 inside of the plate 7, and a sprocket wheel 55 outside of such plate. The gear wheel 54 meshes with a gear wheel 56 on the corresponding end of shaft 20 and also with gear wheel 57 on the end of the disk supporting shaft 21. A chain 58 connects sprocket wheel 55 with a similar sprocket wheel 59 carried by the outer end of the collar 33 (which is similar to the collar 53) and carries a gear wheel 60 on its inner portion, similar to the gear wheel 54. This gear wheel 60 meshes with a gear wheel 61 on the corresponding end of the disk supporting shaft 15, and also with a gear wheel 62 on the corresponding end of the disk supporting shaft 17. Thus both the upper and the lower sets of slitting disks may be driven in planetary fashion by the gears 54 and 60, whichever of the sets of disks may be in operating position.

Mechanism is provided to disconnect from the driving train when desired, the sets of disks which are in disk adjusting position. One of such mechanisms is provided for each of the shafts 15, 17, 20 and 21 and since they may be duplicates, a description of one will serve for all. As shown in Fig. 3 the gear wheel 61 which serves the disk supporting shaft 15 may be made in the form of an outer member of a friction clutch 63 the inner member of which comprises a frusto-conical collar 64, which latter is spined to shaft 15 and urged into frictional engagement with gear 61 by spring 65. A lever 66, pivoted to a bracket 67 on the side piece 7 engages at one end in a groove 68 in the member 64, and at the other end is pivoted to an internally threaded fitting 69. A screw 70 passes through a gear 10 and is held in position by collars 71 and 72, the latter of which may serve as a hand wheel. Thus by rotating the hand wheel 72, lever 66 may be actuated to connect and disconnect the friction clutch members 61 and 64 as desired. As shown in Fig. 1, four of these levers 66 and associated parts above described may be used, one for each of the disk supporting shafts 15, 17, 20 and 21.

The above description has been of specific mechanism to support and adjust the upper and lower sets of slitting disks, and where the scoring disks are carried by separate shafts as in the illustrated embodiment of the invention, similar arrangements of parts may be provided for the upper and lower sets of scoring disks, except that no adjustment corresponding to that provided by the hand wheel 37 need be provided for the scoring disks. Accordingly the above mentioned mechanisms will not be described in detail as applied to the scoring disks, but it may be noted that the drawings show upper sets of scoring disks 73 and 74 respectively carried by shafts 75 and 76, which shafts are supported in gears 77 (Fig. 1) corresponding to the gears 10 and 11 and provided with similar associated parts except hand wheel 37 and directly associated parts. Likewise the drawings show lower sets of scoring disks 78 and 79 carried respectively by shafts 80 and 81 similar to the shafts 20 and 21, and mounted in gears 82 (Fig. 1) and 83 (Fig. 4) corresponding respectively to the gears 22 and 23. As shown in Fig. 4 the gear 83 like the gear 23 is driven by pinion 26 in adjusting the apparatus from one production run to another. Gear box 47a (Fig. 1) similar to the gear box 47 above described and having similar associated parts as above described, may be provided for the slitting disk structures. I have also indicated in Fig. 1, nuts 46a (having similar associated parts) which may be understood as similar to the nuts 46 above described, and levers 66a having similar relation to the lever 66 previously described.

Thus an apparatus of the above nature enables the web to travel continuously therethrough while shifting from one production run to the next, and while the slitting and scoring disks 16 and 18 and 74, 78 for example are in operation, the operator may be adjusting the disks 14, 73 and 19, 79 along their corresponding shafts to the positions needed for the next run.

While a specific embodiment of the invention has been described, it should be understood that changes may be made therein without departing from the invention in its broader aspects, within the scope of the appended claims.

I claim:

1. Paperboard slitting apparatus of the class described, including upper and lower supporting frames disposed respectively above and below the path of travel of a paperboard web passing through said apparatus, each of said frames carrying a plurality of sets of slitting disks, means mounting said frames for movements respectively above and below the path of travel of the web, between positions where different upper and lower sets of disks are respectively in web engaging and disk adjusting position, and means affording conjoint transverse adjustment of said frames with respect to the path of travel of the web.

2. Paperboard slitting apparatus of the class described, including upper and lower supporting frames disposed respectively above and below the path of travel of a paperboard web passing through said apparatus, each of said frames carrying a plurality of sets of slitting disks, means mounting said frames for movements respectively above and below the path of travel of the web, between positions where different upper and lower sets of disks are respectively in web engaging and disk adjusting position, and means affording transverse adjustment of one of said frames with respect to the other frame.

3. Paperboard slitting and/or scoring apparatus of the class described, including upper and lower supporting frames disposed respectively above and below the path of travel of a paperboard web passing through said apparatus, each of said frames carrying a plurality of sets of web engaging disks, and means affording transverse adjustment of said frames with respect to the path of travel of the web.

4. Paperboard slitting and/or scoring apparatus of the class described, including upper and lower supporting frames disposed respectively above and below the path of travel of a paperboard web passing through said apparatus, said frames being pivoted on transverse axes located respectively above and below the path of travel of the web, each of said frames rotatably carrying a plurality of sets of web engaging disks, said sets being disposed in different radial positions with respect to said axes, gearing connecting said frames to move the latter between positions where different upper and lower sets of disks are respectively in web-engaging and disk adjusting position, and driving gearing for said sets of disks including sun gears coaxial respectively with the aforesaid axes, and planetary gears engaging therewith which are respectively connected to the aforesaid sets of web-engaging disks.

5. Paperboard slitting and scoring apparatus of the class described including upper supporting frames disposed in series along and above the path of travel of a paperboard web passing through said apparatus, lower supporting frames disposed in series below the path of travel of the web respectively adjacent said upper frames, each of said frames of one adjacent pair carrying a plurality of sets of slitting disks and each of the frames of another pair of adjusting frames carrying a plurality of sets of scoring disks, and means mounting the frames of each of said pairs of frames for movements respectively above and below the path of travel of the web, between positions where different upper and lower sets of disks thereof are respectively in web-engaging and disk-adjusting position.

6. Paperboard slitting and scoring apparatus of the class described including upper supporting frames disposed in series along and above the path of travel of a paperboard web passing through said apparatus, lower supporting frames disposed in series below the path of travel of the web respectively adjacent said upper frames, each of said frames of one adjacent pair carrying a plurality of sets of slitting disks and each of the frames of another pair of adjusting frames carrying a plurality of sets of scoring disks, said frames being pivoted on transverse axes located respectively above and below the path of travel of the web, gearing respectively connecting adjacent pairs of upper and lower frames to move the latter between positions where different upper and lower sets of disks are respectively in web-engaging and disk-adjusting position, and means for conjointly operating said gearing to shift said pairs of frames between the aforesaid positions.

HOBART W. BRUKER.

Certificate of Correction

Patent No. 2,393,586.   January 29, 1946.

HOBART W. BRUKER

It is hereby certified that errors appear in the printed specification of the above numbered patent requiring correction as follows: Page 2, first column, lines 35 and 36, for "dou- tions are to be performed" read *double facing machine and*; line 42, for "perfomed" read *performed*; line 64, for "righ" read *right*; page 3, second column, line 32, for "spined" read *splined*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*